(12) United States Patent
Jadhav et al.

(10) Patent No.: US 9,176,788 B2
(45) Date of Patent: Nov. 3, 2015

(54) METHOD AND SYSTEM FOR REAL TIME DETECTION OF RESOURCE REQUIREMENT AND AUTOMATIC ADJUSTMENTS

(75) Inventors: Rushikesh Jadhav, Nashik (IN); Piyush Somani, Nashik (IN)

(73) Assignee: ESDS Software Solution Pvt. Ltd., Nashik (IN)

( * ) Notice: Subject to any disclaimer, the term of this patent is extended or adjusted under 35 U.S.C. 154(b) by 240 days.

(21) Appl. No.: 13/495,906

(22) Filed: Jun. 13, 2012

(65) Prior Publication Data

US 2013/0047158 A1    Feb. 21, 2013

(30) Foreign Application Priority Data

Aug. 16, 2011  (IN) .......................... 2308/MUM/2011

(51) Int. Cl.
*G06F 9/455*  (2006.01)
*G06F 9/50*   (2006.01)

(52) U.S. Cl.
CPC ............. *G06F 9/5077* (2013.01); *Y02B 60/142* (2013.01); *Y02B 60/167* (2013.01)

(58) Field of Classification Search
None
See application file for complete search history.

(56) References Cited

U.S. PATENT DOCUMENTS

| 2005/0132362 | A1* | 6/2005  | Knauerhase et al. | 718/1    |
|--------------|-----|---------|-------------------|----------|
| 2005/0262505 | A1* | 11/2005 | Esfahany et al.   | 718/1    |
| 2007/0204266 | A1* | 8/2007  | Beaty et al.      | 718/1    |
| 2011/0099267 | A1* | 4/2011  | Suri et al.       | 709/224  |
| 2011/0131443 | A1* | 6/2011  | Laor et al.       | 714/5.11 |
| 2011/0258621 | A1* | 10/2011 | Kern              | 718/1    |

* cited by examiner

*Primary Examiner* — Sisley Kim
(74) *Attorney, Agent, or Firm* — Rahman LLC

(57) ABSTRACT

A method and system for detecting, in real time, resource requirements of a system in virtual environment and automatic scaling of resource parameters to compensate resource requirement in a system. The Virtual machine controller constantly measures resource utilization in the servers and virtual machines associated with it. If a resource requirement is detected with any virtual machine, the automatic resource scaling system detects the type of resource to be scaled and scales the selected resource. Further, the resource may be scaled up or scaled down, based on the requirements. Further, the scaled resource may be CPU, RAM, disk or any such resource. The proposed system helps to save space and power without compromising security, performance and accessibility.

4 Claims, 5 Drawing Sheets

US 9,176,788 B2

METHOD AND SYSTEM FOR REAL TIME DETECTION OF RESOURCE REQUIREMENT AND AUTOMATIC ADJUSTMENTS

CROSS-REFERENCE TO RELATED APPLICATION

This application claims priority to Indian Application No. 2308/MUM/2011 filed on Aug. 16, 2011, the complete contents of which, in its entirety, is herein incorporated by reference.

TECHNICAL FIELD

The embodiments herein relate to hardware virtualization and, more particularly, to real time detection of resource requirements and automatic adjustment of resource parameters.

BACKGROUND

A virtual machine is a logical computing unit which is formed on a physical computing unit and works similar to a physical computing unit. A virtual machine may be categorized as a system virtual machine and a process virtual machine. A system virtual machine provides a complete system platform that supports the execution of a complete operating system. A process virtual machine is designed to run a single program. A virtual machine facilitates co-existence of multiple OS environments on the same computer.

The resource utilization of a virtual network changes dynamically. Resource utilization is less at times when fewer numbers of systems are accessing the resources and/or data traffic in the network is low. Whereas, when more numbers of users are accessing the resources and/or data rate is high, resource utilization is very high. At the time of resource overloading, resource scaling is to be done to overcome the overloading condition. In existing virtual machine systems at the time of resource requirement, allocation of new resources and/or freeing of existing resources are done manually. In a web hosting industry, where resource requirements change dynamically, manual adjustments may affect the system efficiency and throughput.

SUMMARY

In view of the foregoing, an embodiment herein provides a method and system for automatic scaling of resources in a virtual network. The method measures the resource utilizations in a virtual network and automatically detects the resource requirement associated with the virtual network. Further, upon detection of a resource requirement, the method decides the type of resource to be scaled and scales the resource in order to compensate the resource requirement of the virtual network.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

Figure 1:
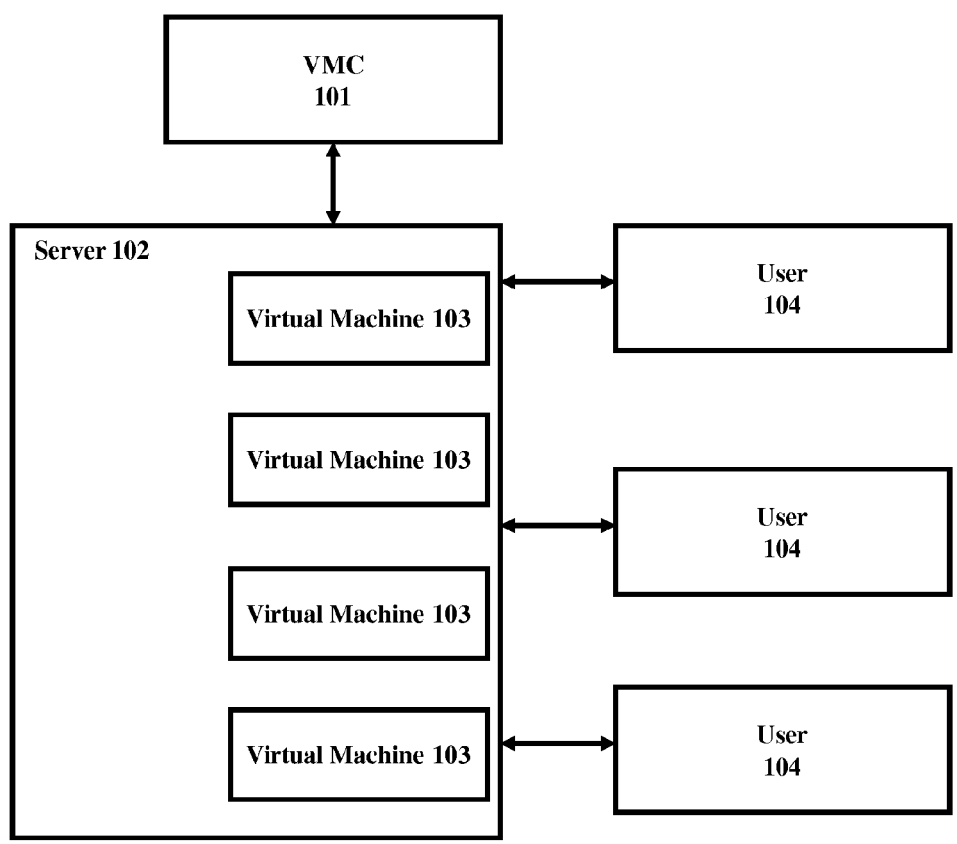
FIG. 1 illustrates a general block diagram of a virtual machine based computing network, as disclosed in the embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method and system for automatic resource scaling by detecting in real time, resource requirement of a system. Referring now to the drawings, and more particularly to FIGS. 1 through 5, where similar reference characters denote corresponding features consistently throughout the figures, there are shown embodiments.

FIG. 1 illustrates a general block diagram of a virtual machine based computing network, as disclosed in the embodiments herein. The figure comprises of a Virtual Machine Controller (VMC) 101, a server 102 and at least one user 104. The VMC 101 may be connected to the server 102 using a suitable means, such as a wired means (LAN, WAN and so on) or a wireless means (Wi-Fi and so on). In an embodiment herein, the VMC 101 may be present within the server 102. In an embodiment, the server 102 may be a web server, a database server, a video streaming server, an application server and/or any such system. The server 102 may have a plurality of virtual machines 103 present within it. At least one user 104 is connected to the server 102. More than one user 104 may be connected to a virtual machine 103. The users 104 may be connected to the server 102 using a suitable means, such as a wired means (LAN, WAN and so on) or a wireless means (Wi-Fi and so on).

The VMC 101 monitors the resources being used by the virtual machine 103. Resource may refer to any or all of CPU, RAM, disk and/or any such memory device associated with the virtual machine 103. When the VMC 101 detects that a change in resources associated with a virtual machine 103 is required, the VMC 101 instructs the server 102 to change the resource allocated to that virtual machine 103. The server 102 scales the parameters associated with that virtual machine 103 in real time, as per instructions from the VMC 101. Real time scaling refers to scaling of the resource parameters while the virtual machine is running. If the VMC 101 detects that at least one of the resources allocated to a virtual machine 103 is being exhausted, then the VMC 101 may instruct the server 102 to increase the allocation of that resource which is being exhausted to that virtual machine 103. Similarly, if the VMC 101 detects that at least one of the resources allocated to a virtual machine 103 is being used very sparsely, then the VMC 101 may instruct the server 102 to decrease the allocation of that resource to that virtual machine 103 which is being used sparsely.

In an embodiment herein, there may be thresholds set, whereby the VMC 101 compares the utilization levels of resources to the thresholds. The thresholds may be defined by an administrator within the network. The threshold defines lower and upper limits for the resources. For example, the thresholds for memory consumption may be set at 256 MB and 3 GB respectively. In another embodiment herein, there may be multiple levels defined, each of the levels with a lower and upper threshold. If the VMC 101 detects that at least one of the resources allocated to a virtual machine 103 is above or equal to an upper threshold, then the VMC 101 may instruct the server 102 to increase the allocation of that resource. Similarly, if the VMC 101 detects that at least one of the resources allocated to a virtual machine 103 is below a lower threshold, then the VMC 101 may instruct the server 102 to decrease the allocation of that resource.

Though, embodiments disclosed above depict a plurality of virtual machines present within a single server, it may be obvious to a person of ordinary skill in the art to enable control of virtual machines present across multiple servers.

Figure 2:
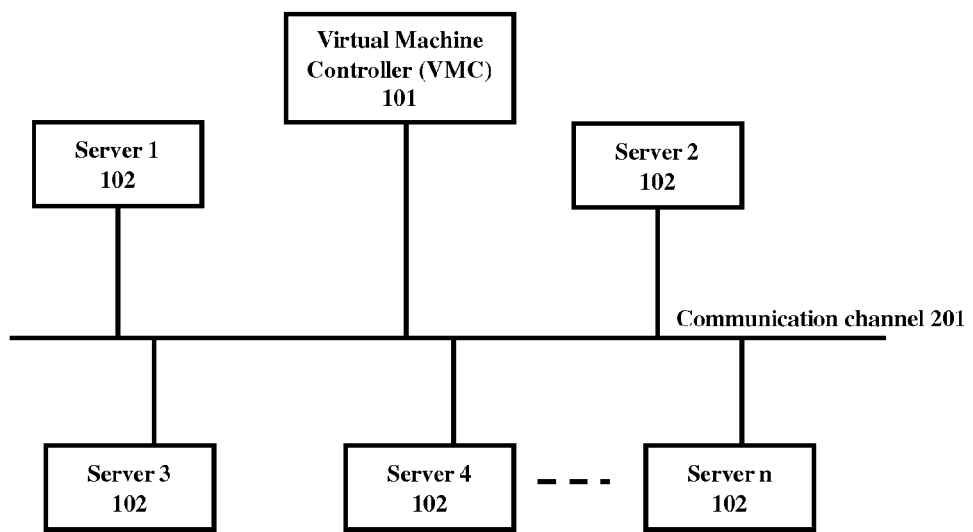
FIG. 2 depicts an example of a configuration of the proposed virtual machine based computer network, as disclosed in the embodiments herein.

FIG. 2 depicts an example of a configuration of the proposed virtual machine based computer network, as disclosed in embodiments herein. In one embodiment, the VMC 101 and the plurality of servers 102 can be connected to a single communication channel 201. The servers 102 comprise means for acting as virtual machines for users connected to each of the servers 102. The servers 102 can communicate with the Virtual Machine Controller 101 through the communication channel 201. Further, the VMC 101 can communicate with the server 102 through the communication channel 201. The VMC 101 monitors resource utilization by each server 102 associated with the network. Further, if the VMC 101 checks and performs resource scaling based on requirement.

Figure 3:
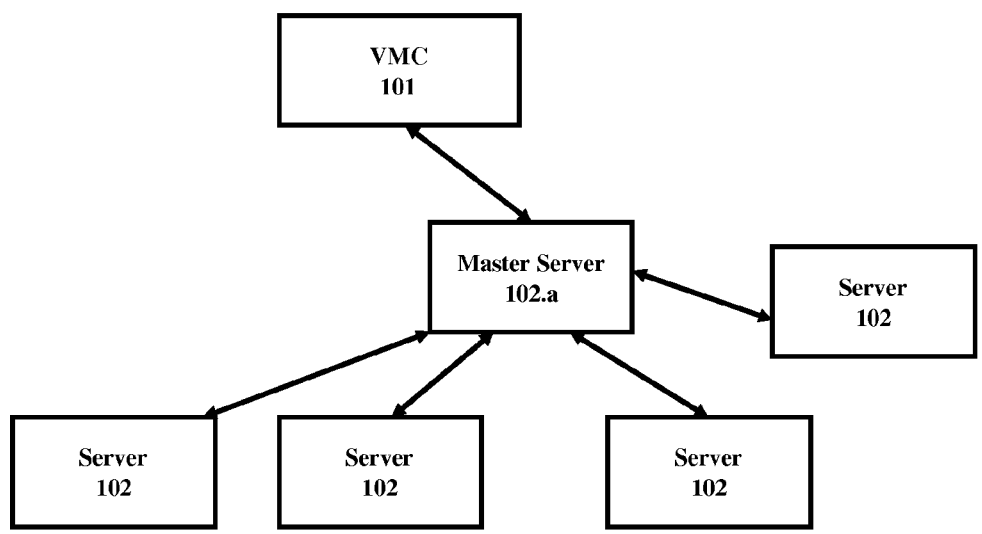
FIG. 3 depicts an example of a configuration of the proposed virtual machine based computer network, as disclosed in the embodiments herein.

FIG. 3 depicts an example of a configuration of the proposed virtual machine based computer network, as disclosed in embodiments herein. The VMC 101 may be connected to a master server 102.*a* which inturn is connected to multiple servers 102. In one embodiment, the master server 102.*a* may have a master-slave association with the plurality of servers 102. The VMC 101 communicates with only the master server 102.*a* and not directly with the servers 102. Further, the master server 102.*a* communicates with the associated servers 102 and the servers 102 communicate with the master server 102.*a*. The servers 102 comprise means for acting as virtual machines for users connected to each of the servers 102. In this architecture, the master server 102.*a* may monitor resource requirements and resource utilizations of the associated servers 102 and may convey the received informations and the resource requirements of the associated servers 102 to the VMC 101.

The above disclosed embodiments serve as examples and do not limit the implementation of a VMC in any other type of network. It may be obvious to a person of ordinary skill in the art to use a VMC in any network, irrespective of the configuration used by the network.

Figure 4:
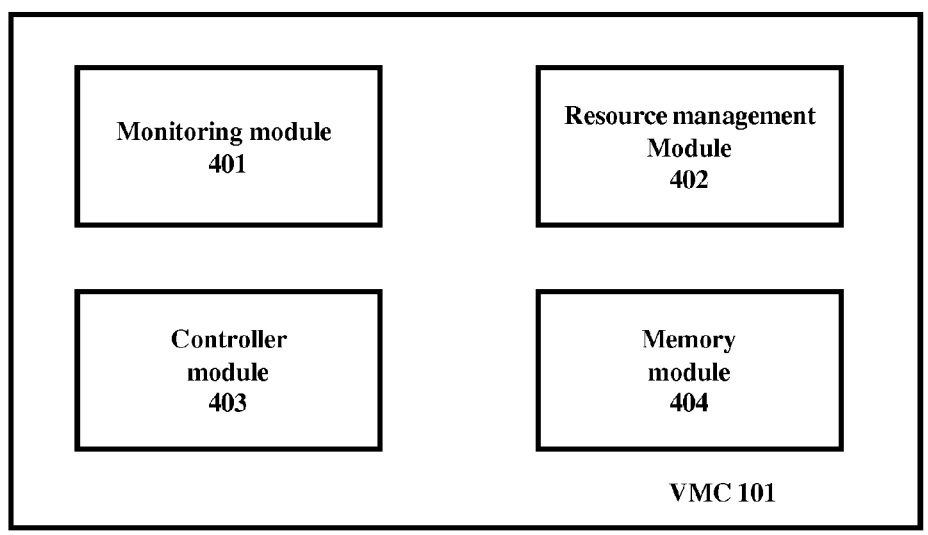
FIG. 4 illustrates a block diagram which shows various components of the proposed virtual machine controller (VMC), as disclosed in the embodiments herein.

FIG. 4 illustrates a block diagram which shows various components of the virtual machine controller (VMC), as disclosed in embodiments herein. The VMC 101 comprises a monitoring module 401, a resource management module 402, a controller 403 and a memory module 404. The monitoring module 401 resource monitors utilization in each of the associated servers. The monitoring module 401 may further monitor the data flow in the network. The resource management module 402 measures resource utilization associated with each server 102. The resource management module 402 further calculates the resource requirement of virtual machines associated with each server 102. Further, by considering the measured resource utilization and the calculated resource requirement, the resource management module 402 decides if the resources being utilized by a server 102 are to be freed or else if a server 102 is to be assigned more resources. Further, based on the requirement, the resource management module 402 may free extra resources being accessed by the server 102 or may allocate resources to a server 102. Further, a controller module 403 associated with the VMC 101 may control and coordinate the working of monitoring module 401 and the resource management module 402. The memory module 404 may be used to store the pre-set resource utilization values and/or any such data.

Figure 5:
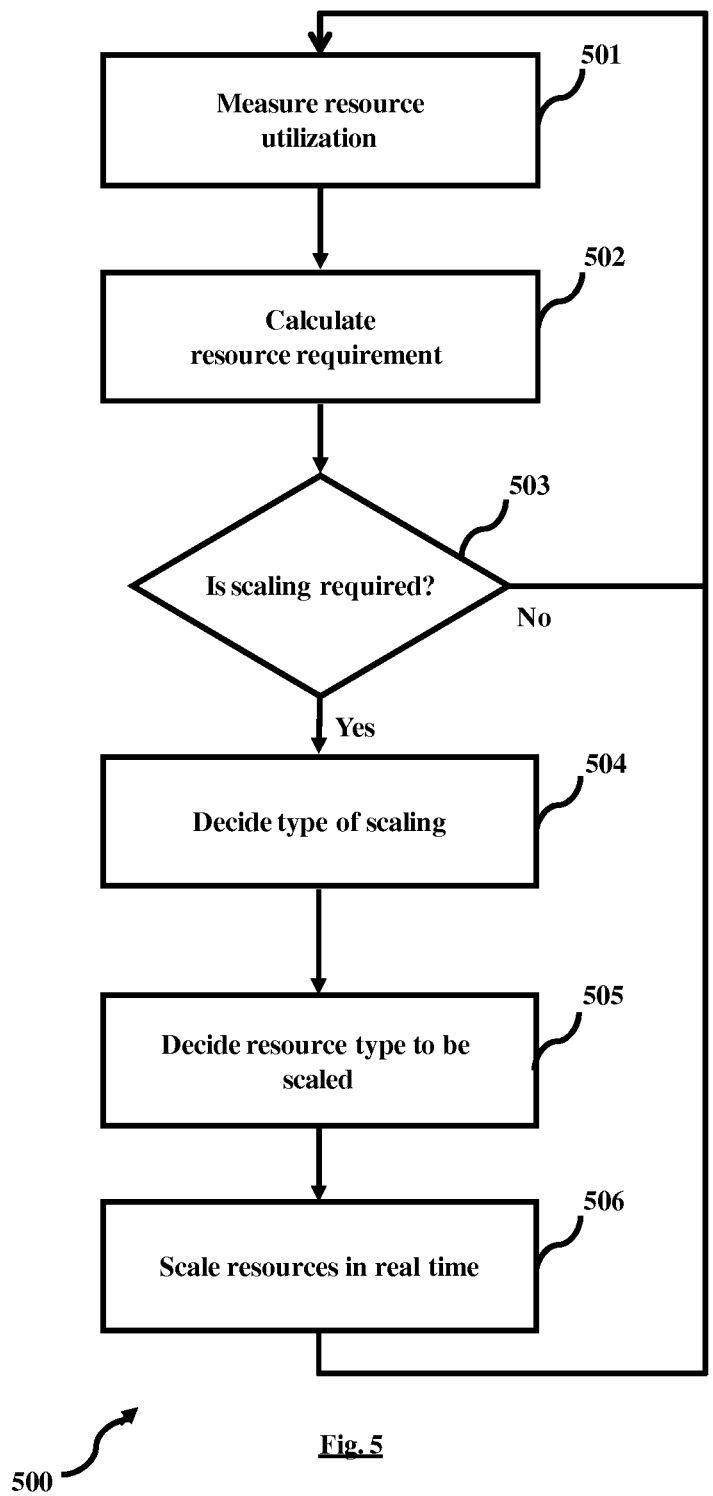
FIG. 5 is a flow diagram which describes the process of automatic resource scaling, as disclosed in the embodiments herein.

FIG. 5 is a flow diagram which describes the process of automatic resource scaling as disclosed in the embodiments herein. A monitoring module 401 associated with the VMC 101 monitors the data flow and resource utilization in the network. In one embodiment, the monitoring module 401 may also measure the extent to which the resources are utilized by each server 102 associated with the VMC 101. Further, a resource management module 402 associated with the VMC 101 measures (501) resource utilization by each server 102 associated with the VMC 101. The resource management module 402 further calculates (502) the resource requirement of each associated server 102. Further, based on the measured resource utilization and the calculated resource requirement, the resource management module 402 decides (503) if scaling is required or not. In one embodiment, the resource management module 402 may decide if scaling is required or not, by comparing the measured resource utilization with a pre-decided threshold level being stored in the memory module 404. If the resource management module 402 decides that scaling is not required, the virtual computing network continues operating. If the resource management module 402 decides that scaling is required, the resource management module 402 decides (504) the type of scaling to be performed. In one embodiment, the scaling may comprise freeing of additional resources being accessed by a server 102 or allocation of additional resources to a server 102. Further, the system decides (505) the type of resource to be scaled. In one embodiment, the type of resource being scaled may comprise CPU, RAM, disk or any such resource. Further, the system performs (506) scaling of resources in real time. Real time scaling implies scaling the resources when the virtual machine is running. The various actions in method 500 may be performed in the order presented, in a different order or simultaneously. Further, in some embodiments, some actions listed in FIG. 5 may be omitted.

Embodiments herein save space and power without compromising security, performance and accessibility of the system. Further, the proposed system provides protection from physical server failure due to virtualization of resources over the internet.

The embodiments disclosed herein can be implemented through at least one software program running on at least one hardware device and performing network management functions to control the network elements. The network elements shown in FIGS. 1-4 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for managing resources allocated to at least one virtual machine in a network, by a virtual machine controller, said method comprising:
   real time monitoring of resource utilization in at least one associated server while a virtual machine is running, by at least a monitoring module, said monitoring module further configured to monitor data flow in said network, wherein said monitoring module is configured to measure said resource utilization associated with said server;
   calculating resource requirement of said virtual machine associated with said server comprising,
   considering and deciding a type of scaling to be performed based on a requirement to scale said resources, said requirement being based on said measured resource utilization and said calculated resource requirement, said scaling including freeing up of said resources in real time and allocating extra resources, by at least a resource management module and setting a pre-set resource utilization value for said resources based on said scaling, wherein said scaling in the real time includes scaling said resources when said virtual machine is running;
   deciding, in response to the deciding the type of scaling, a type of said resources to be scaled;
   real time comparing of the monitored resource utilization with a pre-decided upper threshold and a pre-decided lower threshold by said resource management module to decide if said scaling is required or not;
   controlling and coordinating at least working of said monitoring module and said resource management module by at least a controller module; and
   storing said pre-set resource utilization value in at least a memory module by said controller module.

2. The method, as claimed in claim 1, wherein said method further comprises said virtual machine controller monitoring resources assigned to said at least one virtual machine.

3. A virtual machine controller for managing resources allocated to at least one virtual machine in a network, said virtual machine controller comprising:
   a monitoring module to monitor in real time resource utilization in at least one associated server while a virtual machine is running, said monitoring module further configured to monitor data flow in said network, wherein said monitoring module is configured to measure said resource utilization associated with said server;
   said resource management module to calculate, in real time, resource requirement of said virtual machine associated with said server, the calculation comprising, considering and deciding a type of scaling to be performed based on a requirement to scale said resources, said requirement being based on said measured resource utilization and said calculated resource requirement, said scaling including freeing up of said resources in real time and allocating extra resources and setting a pre-set resource utilization value for said resources based on said scaling, wherein said scaling in the real time includes scaling said resources when said virtual machine is running;
   said resource management module to decide in response to the deciding the type of scaling, a type of said resources to be scaled;
   said resource management module to compare in real time said monitored resource utilization with a pre-decided upper threshold and a pre-decided lower threshold to decide if said scaling is required or not;
   a controller module to control and coordinate at least working of said monitoring module and said resource management module; and
   said controller module to store said pre-set resource utilization value in at least a memory module.

4. The virtual machine controller, as claimed in claim 3, wherein said virtual machine controller further comprises monitoring resources assigned to said at least one virtual machine.

* * * * *